United States Patent [19]

Tanaka

[11] Patent Number: 5,669,026
[45] Date of Patent: Sep. 16, 1997

[54] CAMERA HAVING PUSH BUTTON WHICH PRESSES CIRCUIT BOARD MOUNTED IN FILM RESTRAINING PLATE

[75] Inventor: Yasuhiko Tanaka, Saitama, Japan

[73] Assignee: Fuji Photo Optical Co., Ltd., Saitama, Japan

[21] Appl. No.: 762,058

[22] Filed: Dec. 9, 1996

[30] Foreign Application Priority Data

Jan. 29, 1996 [JP] Japan .................................. 8-012918

[51] Int. Cl.$^6$ ................................................. G03B 17/00
[52] U.S. Cl. ................................... 396/440; 396/542
[58] Field of Search ................................. 396/440, 442, 396/535, 536, 542, 543

[56] References Cited

U.S. PATENT DOCUMENTS 5,502,526   3/1996   Katano ........................... 396/542 X Primary Examiner—Howard B. Blankenship
Attorney, Agent, or Firm—Young & Thompson

[57] ABSTRACT

A camera has a plate for supporting a photo film from a rear surface thereof. The plate is provided with a recess into which a projection is fitted. The projection is integrally formed with an exposure frame and keeps a gap between the plate and the photo film at a constant. A push button is attached to a control circuit board which is disposed at a rear side of the plate. The push button is operatable from the outside of the camera and arranged at a position opposed to the projection via the plate. When the push button is pressed, the plate is received by the projection so that the plate is prevented from being moved toward the photo film.

12 Claims, 4 Drawing Sheets 5,669,026

CAMERA HAVING PUSH BUTTON WHICH PRESSES CIRCUIT BOARD MOUNTED IN FILM RESTRAINING PLATE

BACKGROUND OF THE INVENTION

1. Field of the Invention

The present invention relates to a camera having at least one push button in the rear surface thereof.

2. Description of the Related Art

Recent compact cameras are added various functions, for example, automatic exposure control function, strobe function, zoom function, liquid crystal indicating function and so forth. For that reason, a plurality of switches besides a main switch are provided on the surface of the camera.

As the switches, slide switches and push switches are employed and are made proper use in accordance with purposes. The push switch is more simple than the slide switch in contact mechanism with a control circuit unit so that the push switch has advantages of easy handling. These switches are generally provided on the rear surface of a camera in view of handling performance of a photographer.

FIG. 3 shows composition of a camera in brief. A camera 10 is composed of a main body 11, a front cover 12 and a rear cover 13. The front cover 12 and the rear cover 13 cover the main body 11 from front and rear thereof respectively. The main body 11 is integrally provided with a cassette chamber 14 and a film take-up camber 15. The cassette chamber 14 contains a cassette shell 16. The film take-up chamber 15 is provided with a spool 18 for winding a photo film 17 advanced from the cassette shell 16.

An exposure aperture 19 is formed between the cassette chamber 14 and film take-up chamber 15. The exposure aperture 19 defines an exposed area and determines the position of the photo film 17 in the optical axis direction in association with a film pressure plate 20 which is attached to the rear cover 13 in elastic manner.

A control circuit board 21 mounting a control circuit of the camera 10 is disposed in a gap between the film pressure plate 20 and the rear cover 13. A liquid crystal indicator 22 and a photographic mode changing button 23 are attached to the control circuit board 21 and are appeared from the rear cover 13.

As shown in FIG. 4, when a push switch is employed as the photographic mode changing button 23, upon operating the photographic mode changing button 23, the force pushing it is supplied toward the film surface of the photo film 17. The film pressure plate 20 biased toward the photo film 17 is disposed between the photographic mode changing button 23 and the photo film 17 so that following problems are occurred. The force pushing the photographic mode changing button 23 is transmitted to the photo film 17 via film pressure plate 20. Thus, a flatness of the photo film 17 is damaged by the force.

Generally, in a conventional camera, when a push switch is employed, a protecting plate 24 is provided between the film pressure plate 20 and the control circuit board 21. Accordingly, the pressure by the pushing operation of the switch is adapted to be not transmitted to the film pressure plate 20. The protecting plate 24 is fixedly secured to the rear cover 13 by means of screws.

However, when the protecting plate is provide as stated above, it is necessary to obtain a space for disposing the protecting plate in a camera. It is also necessary to thicken the protecting plate to a certain degree and to give the protecting plate hardness in order to match the force pushing the switch. Thus, such a camera is prevented from being thinned, and the number of members constituting a camera increases so that it is caused to increase the cost of production.

SUMMARY OF THE INVENTION

In view of the foregoing problems, a primary object of the present invention is to provide a camera having at least one push button, in which surface of a photo film is prevented from being bent.

Another object of the present invention is to provide a camera having at least one push button, wherein width of a camera is adapted to be thinned.

In order to achieve the above and other objects of the present invention, a receiving portion is provided in a camera. The receiving portion is integrally formed with an exposure frame of a main body mounted in the camera. The receiving portion projects toward a film supporting plate which is disposed at a rear side of the exposure frame.

The film supporting plate presses a photo film disposed at a rear side of the exposure frame from a rear surface of the photo film. Further, the film supporting plate is provided with a recess into which the receiving portion is fitted so that the receiving portion determines a position of the film supporting plate.

A control circuit board is disposed at a rear side of the film supporting plate. The control circuit board is provided with a first contact portion which is adapted to be opposed to the receiving portion via the film supporting plate.

A rear cover as a rear member is attached to the camera. The rear cover is adapted to cover the rear side of the film supporting plate. The rear cover has an opening through which a photographic mode changing button is provided. The photographic mode changing button is movable toward the film supporting plate and has a second contact portion formed on the rear surface thereof. The second contact portion is adapted to be opposed to the first contact portion.

Upon pressing the photographic mode changing button, the button is moved toward the film supporting plate and the second contact portion comes into contact with the first contact portion. Accordingly, the film supporting plate is pressed by the photographic mode changing button via the first contact portion. However, the first contact portion is opposed to the receiving portion via the film supporting plate so that the receiving portion receives the pressing force of the button. Thus, the photo film is not influenced by the pressing force of the button.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S)

Figure 1:
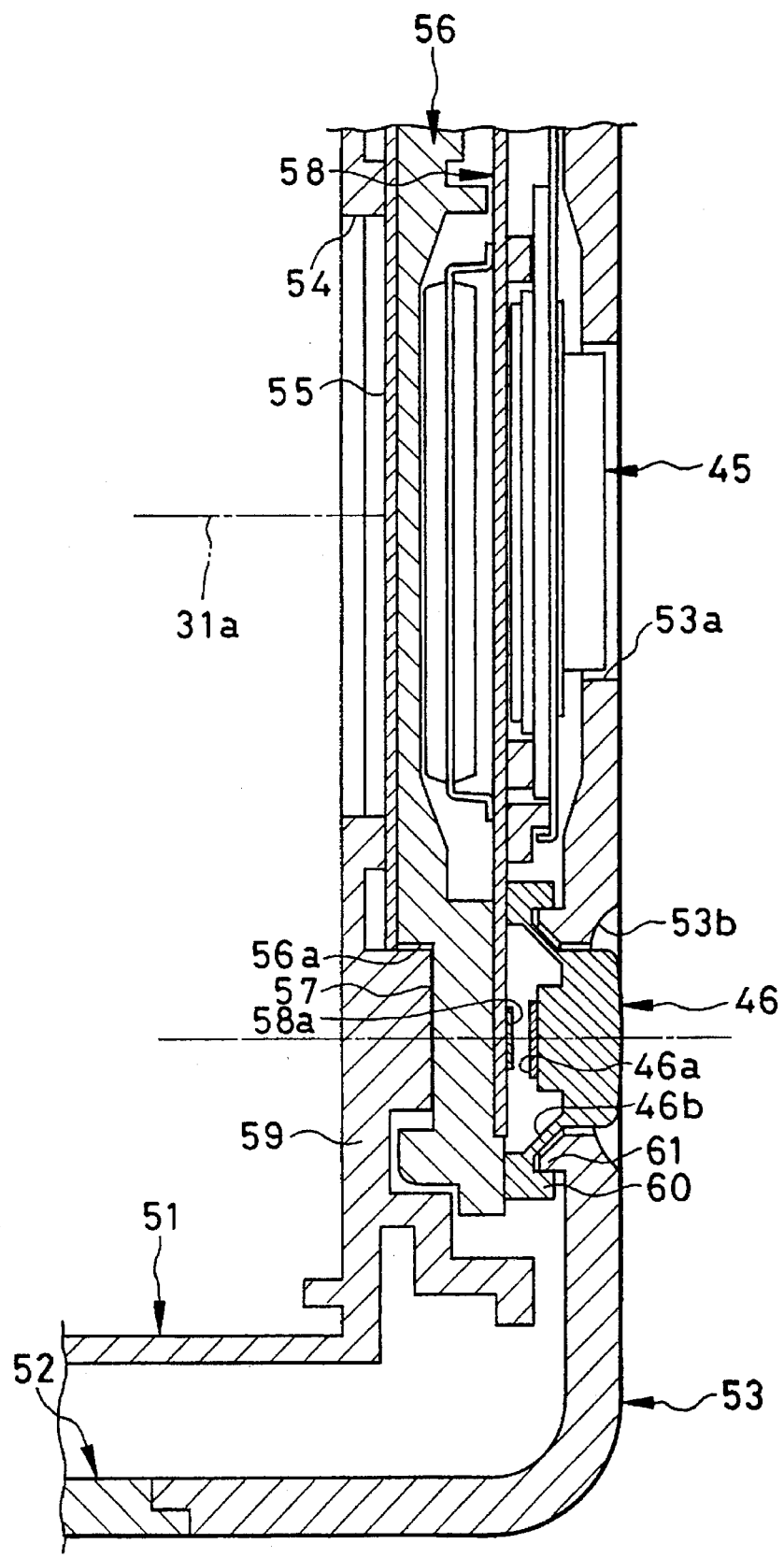
FIG. 1 is a partially sectional view of a camera according to a preferred embodiment of the present invention.
Figure 2A:
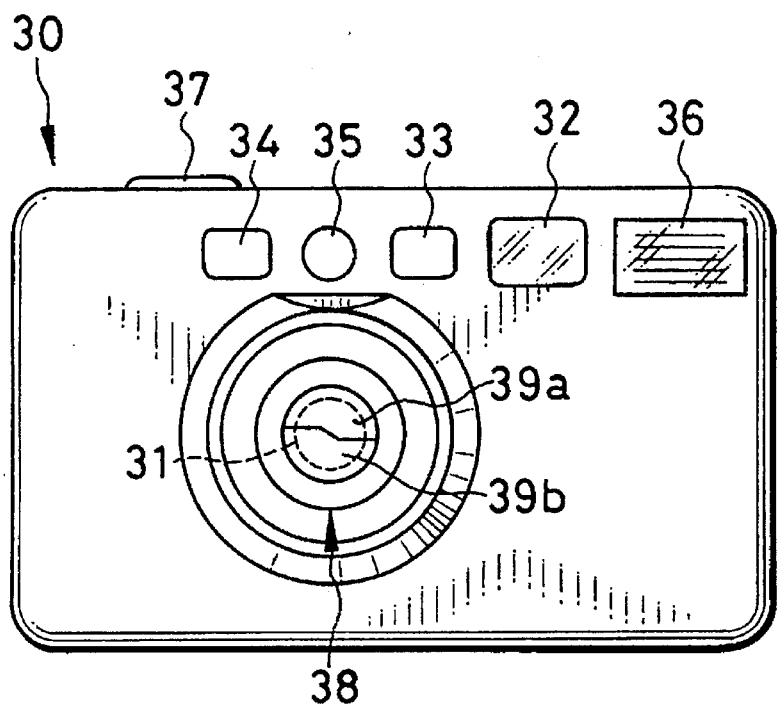
FIG. 2A is a front elevation of the camera
Figure 2B:
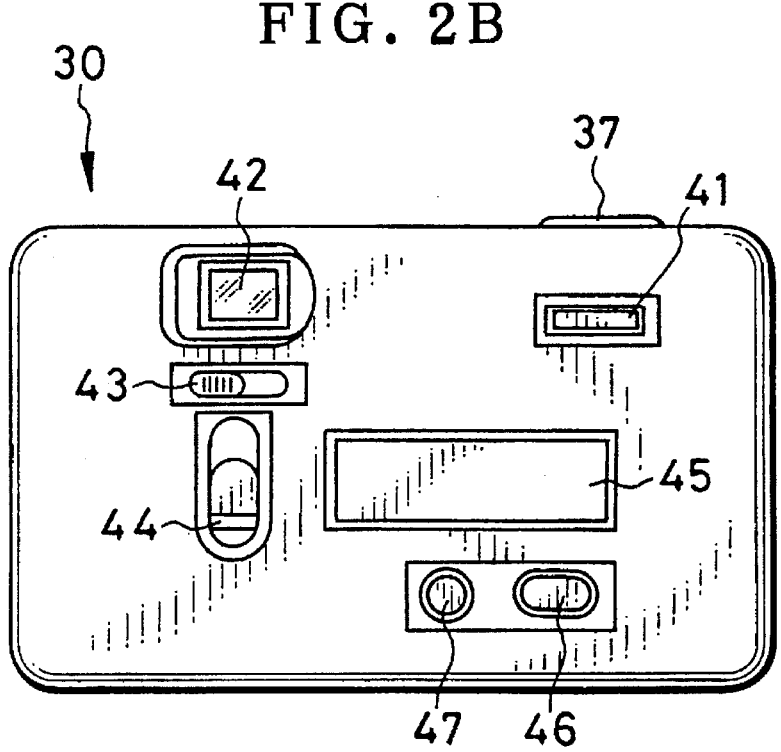
FIG. 2B is a rear elevation of the camera
Figure 3:
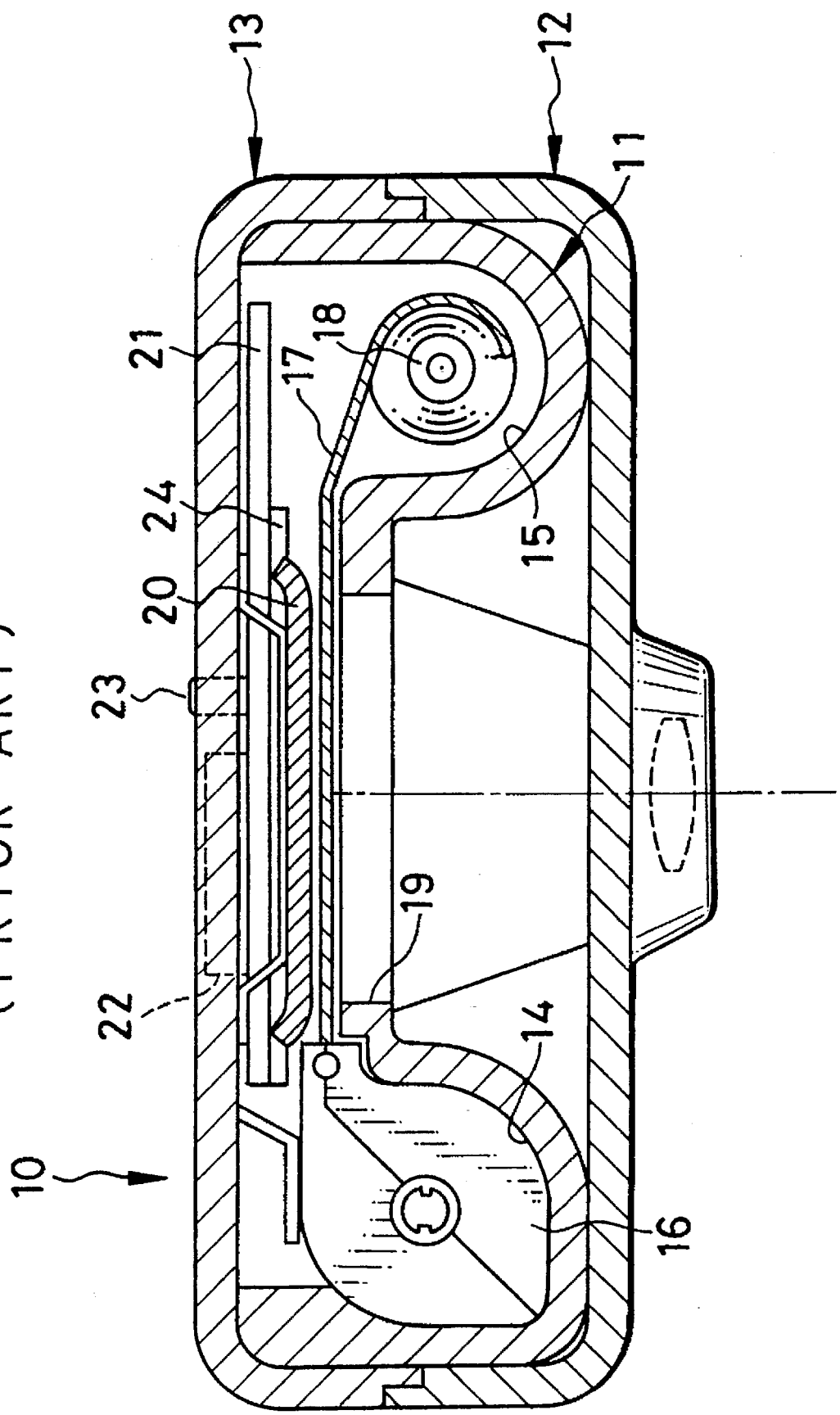
FIG. 3 is a horizontal sectional view illustrating the structure of a conventional camera.
Figure 4:
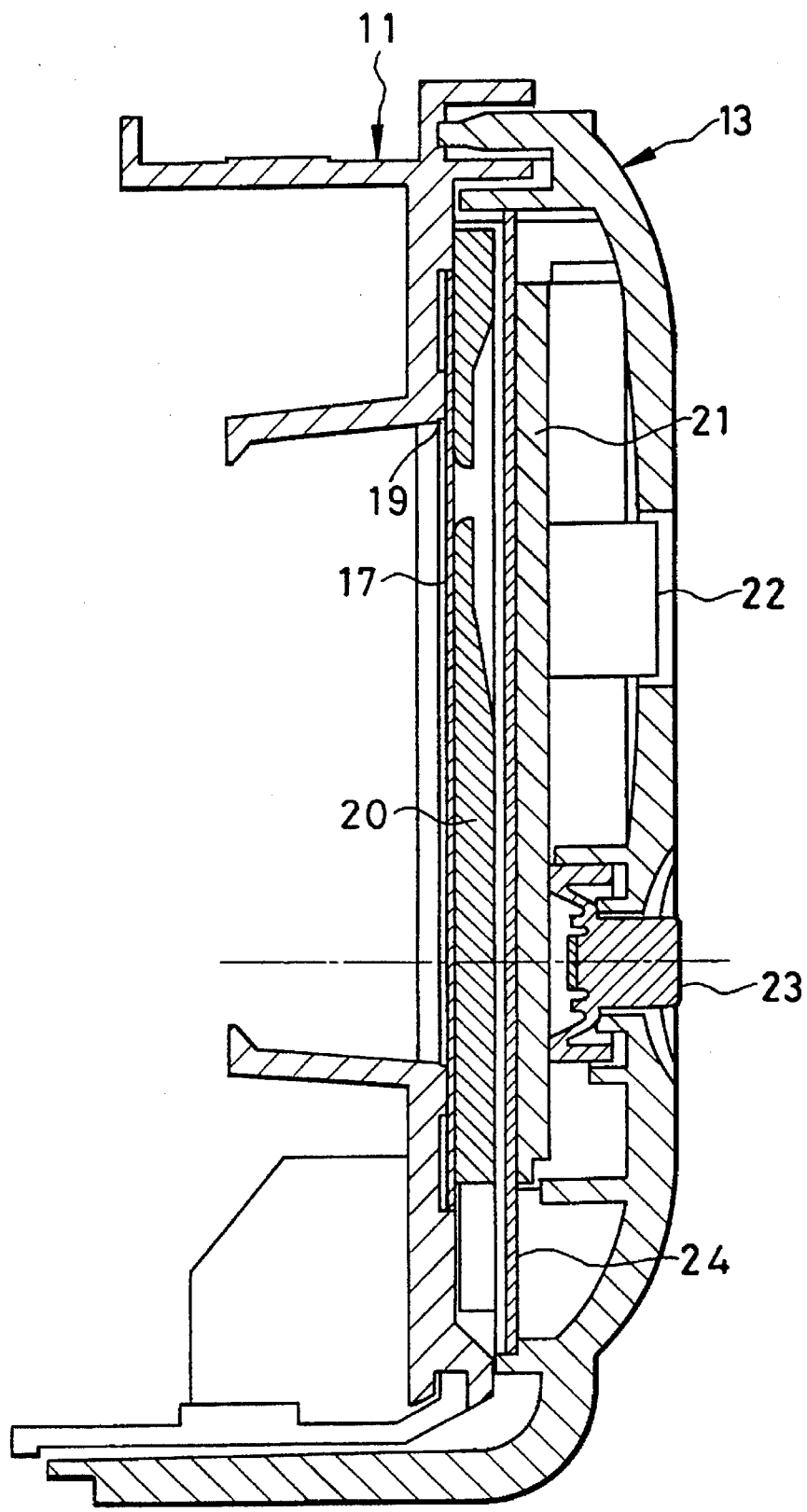
FIG. 4 is a partially sectional view of the camera shown in FIG. 3

FIGS. 1, 2A and 2B show an embodiment of a camera according to the present invention. AS shown in FIG. 2A, a camera 30 has a zoom lens 31 which is arranged on the center portion of the front surface of the camera 30. The camera 30 is provided with a finder objective window 32, a light emitting window 33 and a light receiving window 34 for automatic focus, a photometric window 35 for detecting luminance of a subject and a flash window 36 at the upper portion of the camera 30. Further, the camera 30 is provided with a shutter release button 37 on the upper surface thereof.

The zoom lens 31 is constituted of a zoom lens system and a zoom lens barrel 38. The zoom lens system is contained within the zoom lens barrel 38 and the front of the zoom lens system is opened and closed by lens barriers 39a and 39b. When the camera 30 is used, the zoom lens barrel 38 projects in the front direction, and at the same time, the lens barriers 39a and 39b are opened. The focal length of the zoom lens 31 may be changed at one's discretion by operating a zoom lever 41 provided on the surface of the camera 30 (refer to FIG. 2B).

Upon pressing the shutter release button 37 by half stroke, the focus point is automatically adjusted, and upon successive pressing the shutter release button 37, a subject is exposed on a photo film via the zoom lens 31.

As shown in FIG. 2B, the camera 30 is provided with the zoom lever 41, a finder eye piece window 42, a diopter adjusting knob 43, a picture plane size changing knob 44, a liquid crystal indicator 45, a photographic mode changing button 46 and a main switch 47 on the rear surface thereof. The liquid crystal indicator 45 indicates a date, an exposed frame number of a photo film, a photographic mode and so forth.

The photographic mode changing button 46 and the main switch 47 are constituted of push-type switches and disposed side by side at lower portion of the rear surface. Therefor, the photographic mode changing button 46 is a push button for changing a combination of diaphragm and shutter speed according to a photographic scene in order to take a proper exposure. The photographic mode is changed upon pressing operation of the photographic mode changing button 46. When the photographic mode is changed, an indicated content of the liquid crystal indicator 45 is changed.

When the main switch 47 is turned to on-state, a power is supplied to each of circuit units and the camera 30 is turn to a state of standby for exposure.

By the way, slide-type switches are employed as the diopter adjusting knob 43 and the picture plane size changing knob 44.

As shown FIG. 1, the camera 30 is constituted of a main body 51, a front cover 52 and a rear cover 53. A photographic mechanism, a finder mechanism and so on are attached to the main body 51. The front cover 52 and the rear cover 53 cover the main body 51 from the front and the rear respectively. The main body 51 is provided with an exposure frame 59 and an exposure aperture 54 which are formed at the rear portion of the main body 51. The exposure aperture 54 defines an exposed area on a photo film 55.

In the main body 51, a film supporting plate 56 is attached to a position opposed to the exposure aperture 54. The film supporting plate 56 supports the photo film 55 from the rear side thereof so as to determine the position of the photo film 55 in a same direction with an optical axis 31a of the zoom lens 31. Further, the film supporting plate 56 is adapted to keep the flatness of the photo film 55.

An engaging portion 56a is formed at the lower portion of the film supporting plate 56. The engaging portion 56a engages with a receiving portion 57. The receiving portion 57 is a projection which is integrally formed with the exposure frame 59 and projects toward the film supporting plate 56. The receiving portion 57 is adapted to abut on the film supporting plate 56. In this embodiment, the film supporting plate 56 is provided with a recess into which the receiving portion 57 is fitted. The receiving portion 57 and the recess are substantially similar in shape. Thus the film supporting plate 56 is positioned in the state that a gap between the exposure aperture 54 and the film supporting plate 56 is kept at a constant. The film supporting plate 56 is fixed to the main body 51 by screws or the like.

Moreover, as shown in FIG. 1, the receiving portion 57 guides a lateral edge of the photo film 55 so that the photo film 55 is advanced along the receiving portion 57.

A control circuit board 58 is disposed at the rear side of the film supporting plate 56. A control circuit of the camera 30 is mounted on the control circuit board 58. The liquid crystal indicator 45 and the photographic mode changing button 46 are attached to the control circuit board 58 and appeared in openings 53a, 53b which are formed in the rear cover 53. A terminal for changing a photographic mode, for example, a printed contact portion 58a is provided on the control circuit board 58. The printed contact portion 58a is constituted of a pair of electrodes and opposed to the receiving portion 57 via the film supporting plate 56.

The photographic mode changing button 46 is made from rubber and attached to a position opposed to the printed contact portion 58a. The photographic mode changing button 46 is provided with a contact portion 46a which is formed by conductive rubber. The contact portion 46a is fixed on a central portion of the rear surface of the photographic mode changing button 46. A cup-like leg portion 46b is integrally formed with the photographic mode changing button 46 and adapted to cover the contact portion 46a. The leg portion 46b has flexibility so that the photographic mode changing button 46 is movable in the perpendicular direction relative to the control circuit board 58. Moreover, the leg portion 46b biases the button 46 in a direction away from the control circuit board 58 and a top end 60 of the leg portion 46b engages with periphery 61 of the opening 53b formed in the rear cover 53 so as to prevent the leg portion 46b from going away from the opening.

Upon pushing the photographic mode changing button 46, the button 46 is moved toward the pair of electrodes of the printed contact portion 58a and the contact portion 46a contacts with the pair of electrodes. As the contact portion 46a has conductivity, the pair of the electrodes are electrically connected by the contact portion 46a, so that the photographic mode is changed. Incidentally, the main switch 47 arranged at the side of the photographic mode changing button 46 is also attached to the position opposed to the receiving portion 57.

When a photograph is taken by using the camera 30, the camera 30 is turned to on-state by pressing operation of the main switch 47. Thus, the power is supplied to each of circuit units and the zoom lens barrel 38 projects in the front direction. At the same time, the lens barriers 39a and 39b covering the front surface of the zoom lens 31 are opened and the camera 30 is turned to a state of standby for exposure.

In the liquid crystal indicator 45, a date, an exposed frame number of a photo film, photographic mode and so on are indicated. The photo film 55 is supported by the exposure aperture 54 and the film supporting plate 56 from front and behind.

Next, a photographer selects a photographic mode according to a photographic scene by pressing operation of the photographic mode changing button 46. In this case, the photographic mode changing button 46 is opposed to the printed contact portion 58a for changing the photographic mode. And the printed contact portion 58a is attached to the position opposed to the receiving portion 57 which determines the position of the film supporting plate 56. Therefore, the photographic mode changing button 46 is adapted to be pressed toward the receiving portion 57.

Accordingly, when the photographic mode changing button 46 is pressed, the receiving portion 57 receives the pressing force of the button 46 and prevents the force from being transmitted to a portion of the film supporting plate 56 which contacts with the photo film 55. Thus, the gap between the exposure aperture 54 and the film supporting plate 56 is maintained at a predetermined interval and the flatness of the photo film 55 is kept.

The photographer determines an exposure area and a composition by looking through the finder eye piece window 42. After that, when the shutter release button 37 is pressed by half stroke, the focus point is automatically adjusted, and upon successive pressing the shutter release button 37, a subject is exposed on a photo film 55 via the zoom lens 31. In this case, as the flatness of the photo film 55 is kept, a good image of the subject is exposed on the photo film 55 without distortion.

In the above-described embodiment, the engaging portion is formed at a lower portion of the film supporting plate and the receiving portion is formed at a lower portion of the exposure frame. However, the engaging portion may be formed at a upper portion of the film supporting plate and the receiving portion may be formed at a upper portion of the exposure frame.

Moreover, in the above-described embodiment, the control circuit board is disposed such as the printed contact portion thereof is opposed to the receiving portion, and the photographic mode changing button and the main switch directly contact with the printed contact portion formed on the control circuit board. However, the constitution and the arrangement of the control circuit board are not exclusive. In the present invention, the switch is disposed such as the switch is opposed to the receiving portion so that the contact portion may be provided in a manner that the contact portion is projected from the control circuit board.

When there are a plurality of, for example two, push buttons, a plurality of projections opposed to each of the push buttons may be provided. However, a projection corresponding to a position between the two push buttons may be provided or two or more projections may be disposed at a suitable interval. Further, an elongated projection may be provided so as to correspond to each push buttons.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as being included therein.

What is claimed is:

1. A camera having a film supporting plate which presses a photo film disposed at a rear side of an exposure frame from a rear surface of said photo film, and a cover member covering a rear surface of said film supporting plate, said camera comprising:

a control circuit board disposed between said film supporting plate and said cover member;

a first contact portion provided on said control circuit board;

a push button provided in said cover member and being operatable from an outside of said camera, said push button having a second contact portion opposed to said first contact portion and contacting with said first contact portion when said push button is pushed in order to actuate a control circuit mounted on said control circuit board; and a receiving portion for abutting on said film supporting plate at a position opposed to said first contact portion and determining a position of said film supporting plate.

2. A camera according to claim 1, wherein said receiving portion is integrally formed with said exposure frame.

3. A camera according to claim 2, wherein said receiving portion is provided at a lower portion of said exposure frame.

4. A camera according to claim 2, wherein said receiving portion is provided at a upper portion of said exposure frame.

5. A camera according to claim 2, wherein said receiving portion is a projection projecting toward said cover member and a recess for fitting said projection is provided in said frame supporting plate.

6. A camera according to claim 5, wherein said projection and said recess are substantially similar shape.

7. A camera according to claim 5, wherein said projection guides a lateral edge of said photo film.

8. A camera according to claim 5, wherein said push button is fitted into an opening formed in said cover member and has a flexible leg portion which biases said push button in a direction away from said control circuit board, a top end of said leg portion engages with periphery of said opening so as to prevent said leg portion from going away from said opening.

9. A camera according to claim 8, wherein said first contact portion is a printed contact portion and said second contact portion is formed by conductive rubber.

10. A camera according to claim 9, wherein said push button is a button for changing a photographic mode.

11. A camera having a plate for supporting a photo film from a rear surface thereof, comprising:

a push button being operatable from an outside of said camera; and a projection which contacts with said plate for keeping a gap between said plate and said photo film at a constant, said projection prevents said plate from being moved by said push button when said push button is pressed.

12. A camera according to claim 11, wherein said projection is arranged at a position opposed to said push button.

* * * * *